United States Patent
Bundy et al.

[15] 3,689,521
[45] Sept. 5, 1972

[54] ORGANIC COMPOUNDS AND PROCESSES

[72] Inventors: Gordon L. Bundy, Kalamazoo, Mich. 49007; Norman A. Nelson, Galesburg, Mich. 49053

[73] Assignee: The Upjohn Company, Kalamozoo, Mich.

[22] Filed: July 28, 1969

[21] Appl. No.: 845,526

[52] U.S. Cl........260/468.5, 260/239.55 C, 260/309, 260/348 A, 260/397.4, 260/397.45, 260/397.47, 260/514.5, 424/305
[51] Int. Cl................................................C07c 64/74
[58] Field of Search................260/364, 468 F, 468 S

[56] References Cited

OTHER PUBLICATIONS

March, Advanced Organic Chemistry, pp. 366– 369 (1968).
House, Modern Synthetic Reactions, p. 267 (1965).

*Primary Examiner*—Lorraine A. Weinberger
*Assistant Examiner*—Robert Gerstl
*Attorney*—Eugene O. Retter and Willard L. Cheesman

[57] ABSTRACT

This invention relates to novel ring-D seco steroid transformation products, of the following formula and tautomeric forms thereof and to processes for their preparation:

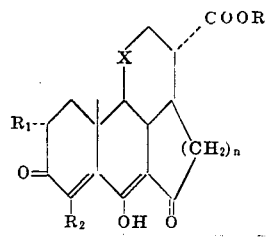

wherein R is lower-alkyl, $R_1$ and $R_2$ are each hydrogen or methyl, X is methylene

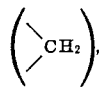

carbonyl

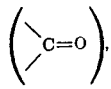

α-hydroxymethylene

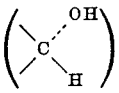

or β-hydroxymethylene

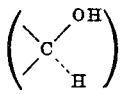

and $n$ is the whole number 1, 2, or 3. The compounds of the above Formula 1 are active anti-inflammatory agents.

1 Claim, No Drawings

ORGANIC COMPOUNDS AND PROCESSES

SUMMARY OF THE INVENTION

The new compounds of this invention and the processes for their preparation are illustratively represented by the following reaction sequence A:

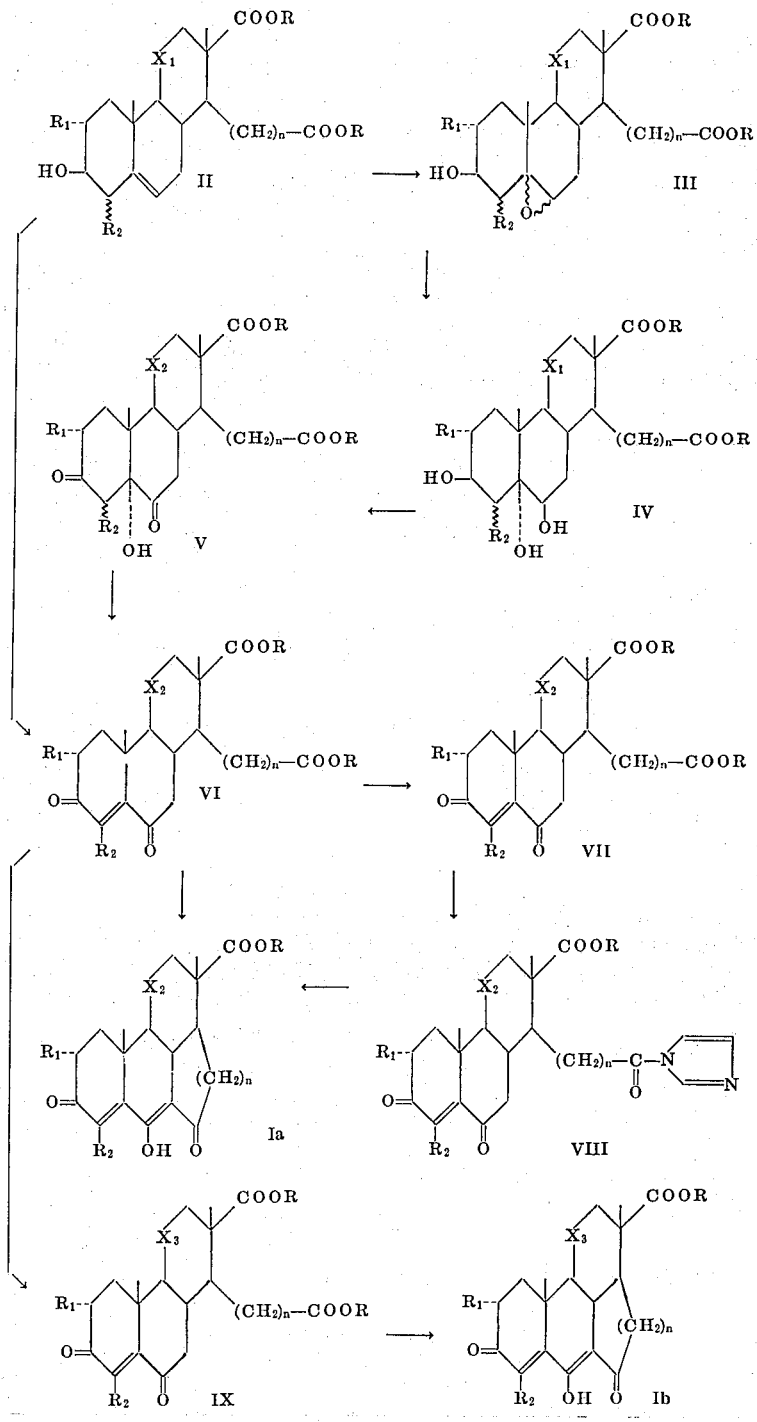

wherein R, $R_1$, $R_2$ and n have the meanings previously given; $X_1$ is methylene, or β-hydroxymethylene; $X_2$ is methylene or carbonyl; and $X_3$ is α-hydroxymethylene or β-hydroxymethylene.

In this application the term "lower-alkyl" means an alkyl radical of one to six carbon atoms, inclusive, such as methyl, ethyl, propyl, butyl, amyl, hexyl and isomeric forms thereof. The wavy lines appearing in the structural formulas indicate the α (alpha) configuration, the β (beta) configuration and mixtures thereof.

Formula I, above, is a combination of the compounds of Formula Ia and Ib, which are prepared in accordance with reaction sequence A shown above.

The novel compounds of this invention can be represented by formulas other than Formulas I, Ia, and Ib. For example with regard to Formula I, among such other formulas are

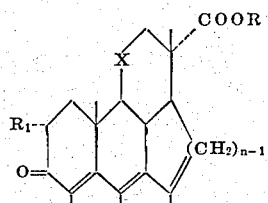

and

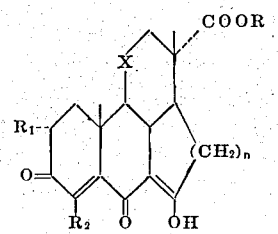

wherein R, R₁, R₁, X, and $n$ have the meanings given above. Compounds of the above formulas are tautomeric with compounds of Formula I. For convenience, reference will be made hereinafter only to Formulas I, Ia, and Ib. It is to be understood, however, that the novel compounds of this invention are likely to be mixtures of tautomeric forms, the compositions of which are dependent on such factors as the nature of $R_1$ and $R_2$, and the environment. In some instances, one form or another may predominate.

The novel compounds of Formula I of this invention are active anti-inflammatory agents which can be used in dosages of 0.5–15 mg./kg. in the treatment of gouty arthritis, rheumatoid arthritis, rheumatoid spondylitis, osteoarthritis, psoriatic arthritis, acute superficial thrombophlebitis and painful shoulder syndromes such as peritendinitis, capsulitis, bursitis, and acute shoulder arthritis as well as contact dermatitus, atopic dermatitis, neurodermatitis, anogenital pruritus, seborrheic dermatitis, and the like, and for the relief of pain and fever.

The novel compounds of Formula I also find application in the local treatment of inflammatory conditions in animal mastitis, a disease of the mammary glands which can be of particular concern in milk-producing animals such as cows.

Suitable solid dosage forms include tablets, pills, capsules, granules, powders, suppositories, and the like. Advantageously, the pharmaceutical carriers for such solid forms include corn starch, lactose, dicalcium phosphate, terra alba (calcium sulfate), talc, stearic acid, magnesium stearate and gums. Suitable fluid dosage forms include solutions, suspensions, syrups and emulsions. Advantageously, the pharmaceutical carrier for such fluid forms comprise water, oils and water-oil emulsions. If desired, suitable dispersing or suspending agents can be included, for example, tragacanth, acacia, alginates, dextran, sodium carboxymethylcellulose, methylcellulose, polyvinylpyrrolidone, gelatin and mixtures thereof. Suitable oils for solutions and water-oil emulsions include cottonseed oil, sesame oil, coconut oil and peanut oil.

The starting materials of Formula II for the process of this invention are prepared as hereinafter described.

In carrying out the process of this invention, the selected compound II is oxidized with chromic acid, Jones reagent is preferred, a solution of 26.72 g. of chromium trioxide in 23 ml. of concentrated sulfuric acid diluted with water to a volume of 100 ml. [Djerassi et al., J. Org. Chem. 21, 1547 (1956)] to obtain the compounds of Formula VI. Either a theoretical amount or excess of oxidant can be employed. The reaction can be carried out within a relatively wide temperature range, for example, about 0° C. to about 60° C., however a temperature range of about 20° C. to about 35° C. is preferred, about room temperature (25° C.) is convenient and advantageous. The product VI is recovered from the reaction mixture by conventional methods.

Alternatively, the compounds of Formula VI are prepared by treating the selected compound of Formula II with m-chloroperbenzoic acid to yield the corresponding 5,6-epoxide (III) (See L.F. Fieser and M. Fieser, "Reagents for Organic Synthesis," John Wiley and Sons, Inc., New York, 1967, p. 136). The 5,6-epoxide thus obtained is then treated with aqueous perchloric acid in acetone in accordance with the procedure of Bowers et al. Tetrahedron 8, 116 (1960). to give the 3,4,6-triol (IV). The triol so obtained is then oxidized with chromic acid (Jones reagent) as hereintofore described to give the corresponding 5-hydroxy-3,6-dione (V) which is dehydrated in accordance with methods known in the art, for example, using acetic acid, or hydrogen chloride in chloroform to obtain the corresponding $\Delta^4$-3,6-dione (VI).

The $\Delta^4$-3,6-dione (VI) is then cyclized under basic conditions to give the corresponding compound of Formula Ia. Illustrative of bases which can be used are alkali metal hydrides, such as sodium, potassium or lithium hydride; alkali metal alkoxides such as potassium t-butoxide, sodium methoxide, lithium ethoxide, and the like; sodium, potassium or lithium hydroxide in alcohols or aqueous alcohols; quaternary ammonium hydroxide; alkaline earth hydroxides such as barium or calcium hydroxide, and the like. The reaction is advantageously conducted in an organic solvent such as alcohol, e.g., methanol, ethanol, propanol, isopropanol, butanol and tert.-butanol; tetrahydrofuran, diglyme, dimethylformamide, dioxane or other suitable solvent. The cyclization is preferably conducted under anhydrous conditions using an alkali metal hydride, e.g., sodium hydride, in an inert solvent such as tetrahydrofuran, dimethylformamide, diglyme, and the like. The cyclization can be carried out within a broad temperature range such as from about −10° C. to the boiling point of the reaction mixture. Temperatures within the range of from about 0° C. to about 30° C. are especially advantageous. The compounds of Formula Ia, thus obtained, can be recovered from the reaction mixture and purified in accordance with conventional methods such as chromatography and/or crystallization from a suitable solvent.

Alternatively, the compounds of Formula Ia are prepared by subjecting the compounds of Formula VI to selective ester hydrolysis in accordance with the procedure of Kiersted et al. J. Med. Chem. 10, 177 (1967). The selected diester VI is heated at reflux for about 1 hour in an aqueous alkanolic sodium or potassium hydroxide solution, e.g., methanolic sodium hydroxide, and the product VII obtained on acidification is recovered from the reaction mixture by conventional methods, for example, by extraction with a suitable organic solvent such as methylene chloride or ether. The mono-acid (VII) thus obtained is then converted to the imidazolide (VIII) in accordance with the procedure of H. A. Staab, Angen, Chem. Int. Ed. Engl. 1, 351 (1962). The selected mono acid (VII) in an inert solvent, such as tetrahydrofuran, is treated with an excess, for example, two equivalents of N,N'-carbonyldiimidazole at about room temperature (about 20° to 30° C.) and the reaction mixture is stirred for about 3 hours at the same temperature. The imidazolide (VIII) thus obtained is then subjected to cyclization, to give the compounds of Formula Ia, in the same manner as described hereinabove for the convertion of the compounds of Formula VI to Ia. Alkali metal hydrides are preferred for carrying out the cyclization. The product Ia is recovered by conventional methods as described above.

The compounds of Formula I wherein X is α-hydroxymethylene or β-hydroxymethylene are prepared by selectively reducing the compounds of Formula VI, wherein X is carbonyl, in accordance with procedures known in the art. The selected compound (VI) is treated with sodium borohydride in an inert solvent, such as methylene chloride-ethanol, followed by selective oxidation with manganese dioxide of any allylic alcohols inadvertently produced to give the corresponding compounds of Formula IX, which are then cyclized to give the compounds of Formula Ib in the same manner as hereintofor described for the cyclization of the compounds of Formula VI to give the compounds of Formula Ia. Alkali metal hydrides are again preferred. The compounds of Formula Ib, are isolated and purified by conventional methods such as chromatography and/or crystallization from a suitable solvent.

The starting compounds (II) for reaction sequence A, above, are prepared in accordance with reaction sequence B as follows:

Reaction Sequence B

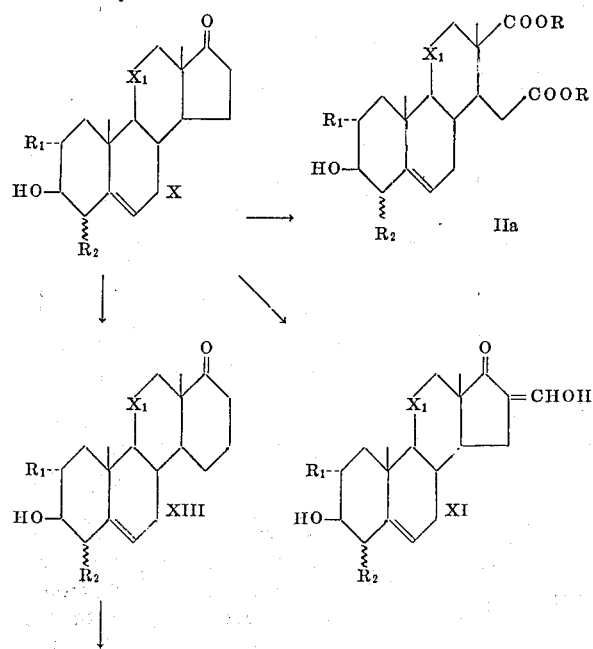

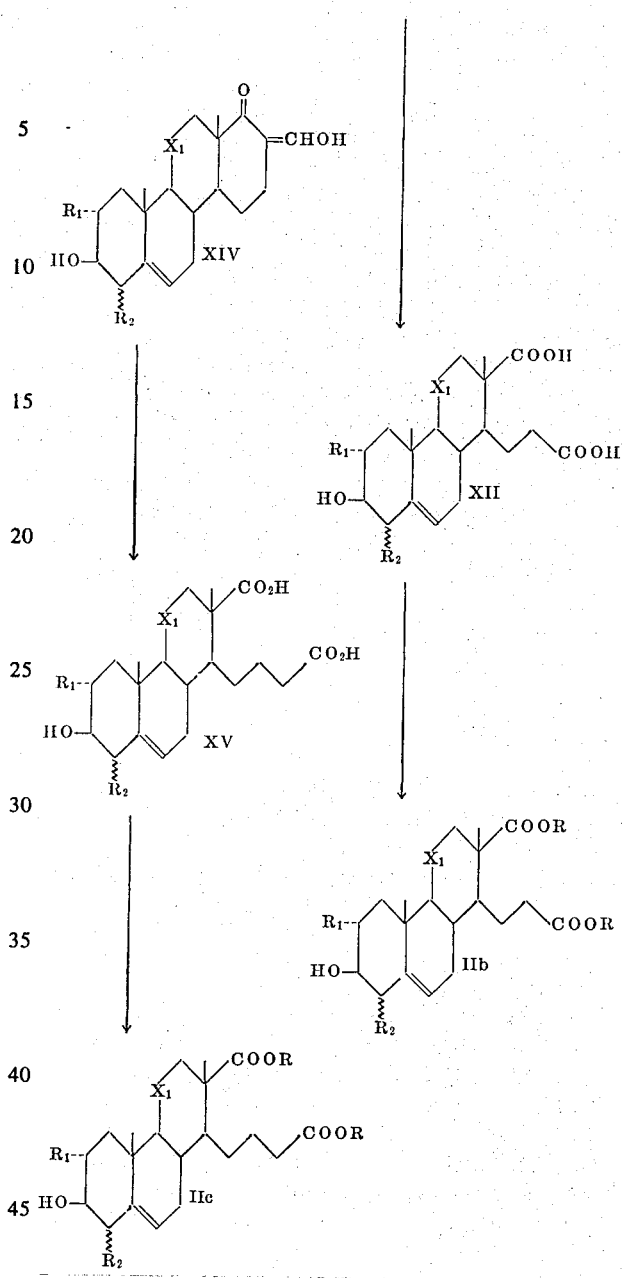

wherein R, $R_1$, $R_2$ and $X_1$ have the meanings previously given.

Starting materials (X) for reaction sequence B are for the most part known in the art or can be prepared in accordance with procedures hereinafter described. The starting materials (X) are namely as follows:

3β-hydroxyandrost-5-ene-17-one,
3β,11β-dihydroxyandrost-5-ene-17-one,
3β-hydroxy-2-methylandrost-5-ene-17-one,
3β-hydroxy-4-methylandrost-5-ene-17-one,
3β,11β-dihydroxy-2-methylandrost-5-ene-17-one,
3β,11β-dihydroxy-4-methylandrost-5-ene-17-one,
3β-hydroxy-2,4-dimethyl-5-ene-17-one, and
3β,11β-dehydroxy-2,4-dimethyl-5-ene-17-one.

The compounds of Formula II, wherein n is 1, represented by Formula IIa in reaction sequence B, are prepared from the compounds of Formula X, by treating the selected compound X with an alkali metal alkoxide, such as sodium methoxide, potassium ethoxide, sodium propoxide, potassium t-butoxide, and the like, in a suitable solvent such as an alkanol, e.g., methanol, ethanol propanol, isopropanol, t-butanol and the like, followed by treatment with solid iodine and oxygen at low temperatures, about −10° C. to about +10° C., to obtain the corresponding compounds of Formula II [L.A. Freiberg, J. Am. Chem. Soc. 89, 5297 (1967)]. The compounds (II) are isolated and purified by conventional methods such as extraction into a suitable organic solvent, e.g., ether, methylene chloride, etc., and crystallization if desired.

The compounds of Formula II, wherein $n$ is 2, represented by Formula IIb in reaction sequence B, are prepared by treating a compound of Formula X with ethyl formate and an alkali metal hydride such as sodium, potassium or lithium hydride for about 24 hours at room temperature (about 20°–35° C.) to give the corresponding 16-hydroxymethylene derivative (XI), which is recovered from the reaction mixture by conventional methods. For example, the reaction mixture is diluted with water, acidified and the precipitated product thus obtained is isolated by filtration.

The 16-hydroxymethylene compound thus obtained is then subjected to oxidative cleavage with retention of all of the carbon atoms. The selected 16-hydroxymethylene compound (XI) in a suitable inert organic solvent or solvent mixture, e.g., methanol, ethanol, tetrahydrofuran, methylene chloride mixtures thereof, and the like, methanol-methylene chloride is preferred, is treated with 30 percent hydrogen peroxide in the presence of a small amount of base, sodium or potassium hydroxide is preferred to obtain the corresponding diacid XII, which is recovered by conventional methods, for example, the reaction mixture is concentrated, diluted with water and the product recovered by filtration.

The diacids (XII) are then converted to their corresponding dialkyl esters (IIb) in accordance with known methods, for example, by reaction with an excess of an ethereal diazoalkane containing from one to six carbon atoms inclusive, such as diazomethane, diazoethane, diazopropane, diazobutane, diazopentane, diazohexane and the like, in a suitable organic solvent such as tetrahydrofuran, ether, methylene chloride, methanol, mixtures thereof, and the like. When the reaction is complete, the excess diazoalkane is destroyed with acetic acid and the product is isolated and purified by conventional methods, for example, chromatography or by crystallization from a suitable solvent. Alternatively, the diacid (XII) can be converted to the diester (IIb) using standard esterification conditions, for example, using an alkanol such as methanol, ethanol, isopropanol s-butanol, and the like, in the presence of a mineral acid such as sulfuric acid.

The compounds of Formula II, wherein $n$ is 3, represented by Formula IIc in reaction sequence B, are prepared from the compounds of Formula X by subjecting the selected compound of Formula X to a standard Tiffeneau ring expansion, Tiffeneau et al., Compt. rend. 205 54 (1937) as modified by Plattner et al., Helv. 33, 1093 (1954). The ring expansion involves (I) formation of the 17-cyanohydrin, (2) reduction of the cyanohydrin with lithium aluminum hydride and (3) followed by treatment with sodium nitrite in acetic acid to obtain the corresponding compound (XIII).

The compounds of Formula XIII thus obtained, are then converted to their corresponding 16-hydroxymethylene derivatives (XIV), the 16-hydroxymethylene derivative so obtained is converted to the corresponding diacid (XV) and the diacid is esterified to give the corresponding diester of Formula IIc, in accordance with the procedures set forth above, for the conversion of the compounds of Formulas X to XI to XII to IIb.

The starting materials (X) for reaction sequence B, above, are either known in the art or can be prepared from known corticosterones (XVI) in accordance with the following reaction sequence C.

Reaction sequence C.

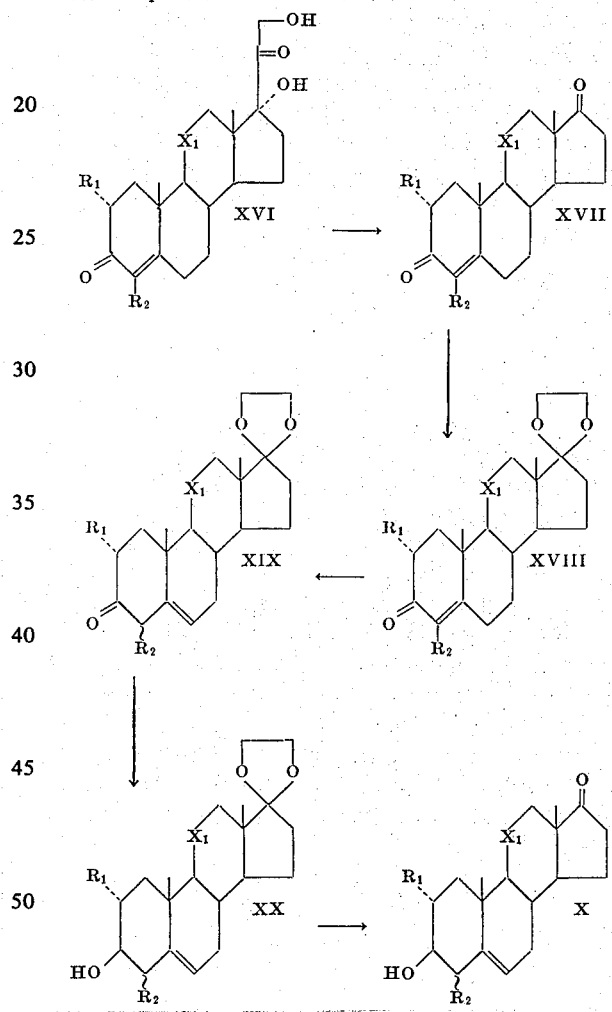

In carrying out reaction sequence C, the selected corticosterone of formula XVI is converted to the corresponding 17-ketone (XVII) using sodium bismuthate in acetic acid at about 20° to 30° C. (about room temperature), in accordance with methods known in the art, for example, Djerassi "Steroid Reactions," chap. 10, p. 419, Holden-Day Inc., San Francisco, Calif. The 17-ketone thus obtained is then converted to the 17-monoketal (XVIII) by selective ketalization with ethylene glycol in the presence of a controlled amount of p-toluenesulfonic acid in accordance with the procedure of Herzog et al. J. Am. Chem. Soc. 75 4425 (1953). The ketalized compound (XVIII) is then subjected to deconjugation to obtain the corresponding compound of formula XIX in accordance with the procedure of Ringold et al., Tetrahedron Letters 15, 669 (1962). The selected compound (XVIII) in t-butyl alcohol and tetrahydrofuran is treated with a 10-fold excess of potassium t-butoxide under nitrogen at room temperature (about 20°–30° C.). When the reaction is complete about 1 to 24 hours, the reaction mixture is acidified by the rapid addition of a large excess of dilute aqueous acetic acid and the product is isolated by conventional methods, for example by extraction with a suitable solvent such as methylene chloride. The compound (XIX) thus obtained is then converted to the corresponding homoallylic alcohol (XX) by reduction with lithium aluminum hydride, sodium borohydride and the like, in accordance with methods known in the art. The compound XX is then converted to compound X by removal of the protective ethylene ketal group in accordance with known methods. For example, Djerassi, "Steroid Reactions" pp. 17–22, Holden-Day Inc., San Francisco, California (1963). For example, the selected compound XX is hydrolyzed with an aqueous mineral acid such as hydrochloric acid in the presence of a cosolvent such as methanol, acetone, tetrahydrofuran, and the like.

The following preparations and examples illustrate the best mode contemplated by the inventors for carrying out their invention, but are not to be construed as limiting the scope thereof.

Preparation 1: 16-(hydroxymethylene) androstenolone (XI)

A solution of 132 g. dehydroepiandrosterone (X) in about 1320 ml. of benzene is treated with 66 ml. of ethylformate and 39.5 g. of sodium hydride for about 24 hours at room temperature (about 25° C.). The mixture is then diluted with water and the aqueous layer is separated from the organic layer. The aqueous layer is acidified with dilute hydrochloric acid and the precipitate thus obtained is recovered by filtration to give 144 g. of 16-(hydroxymethylene) androstenolone, m.p. 236°–241° C.

Preparation 2: 2-carboxy-1,2,3,4,4a,4b,5,6,7,8,10,10a-dodecahydro-7-hydroxy-2,4b-dimethyl-1-phenanthrenepropionic acid, dimethyl ester (IIb)

To a suspension of 106 g. (0.335 mole) of 16-(hydroxymethylene) androstenolone (XI) in 2000 ml. of reagent grade methanol and 1,000 ml. of methylene chloride is added, in one portion, 320 ml. of 30 percent hydrogen peroxide and 0.5 ml. of 10 percent aqueous sodium hydroxide at about room temperature. The mixture is stirred under nitrogen for about 5 hr. at about room temperature. Approximately one half of the solvent is then removed at reduced pressure (maximum temperature, 30°). The mixture is diluted with 7 l. of water and allowed to stand at about 5° C. for 18 hours. Filtration afforded, after drying at 80° C. under vacuum for about 24 hours, 115 g. (98 percent yield) of 2-carboxy-1,2,3,4,4a,4b,5,6,7,8,10,10a-dodecahydro-7-hydroxy-2,4b-dimethyl-1-phenanthrenepropionic acid (XII), m.p. 223°–227° C.

A suspension of 55 g. (o.157 mole) of the 2-carboxy-1,2,3,4,4a,4b,5,6,7,8,10,10a-dodecahydro-7-hydroxy-2,4b-dimethyl-1-phenanthrenepropionic acid (XII), thus obtained in 800 ml. of anhydrous ether is treated with ethereal diazomethane (0.50 mole), added in small portions over 1 hour until the yellow color remains and nitrogen evolution ceases. Then 5 ml. of glacial acetic acid is added to destroy the excess diazomethane and most of the solvent is removed at reduced pressure. Filtration gives 40 g. (67 percent yield) of crystalline 2-carboxy-1,2,3,4,4a,4b,5,6,7,8,10,10a-dodecahydro-7-hydroxy-2,4b-dimethyl-1-phenanthrenepropionic acid, dimethyl ester (IIb), m.p. 126°–127° C., which is recrystallized from ether-hexane to give an analytical sample, m.p. 129°–130° C.; IR ($\nu$ max 1725,1710 cm.$^{-1}$), NMR, and mass (calcd. 378.2406; found 378.2428) spectra are consistent with the structure.

Anal. Calcd. for $C_{22}H_{34}O_5 = C,69.81; H,9.05$.
Found: C, 69.55; H,8.96.

EXAMPLE 1

2-carboxy-1,2,3,4,4a,4b,5,6,7,9,10,10a-dodecahydro-2,4b-dimethyl-7,9-dioxo-1-phenanthrenepropionic acid, dimethyl ester (VI)

A solution of 500 mg. of 2-carboxy-1,2,3,4,4a,4b,5,6,7,8,10,10a-dodecahydro-7-hydroxy-2,4b-dimethyl-1-phenanthrenepropionic acid, dimethyl ester (1.32 mmoles) in 20 ml. of acetone is cooled to about 0° C. and treated with 3 ml. (12 mmoles) of Jones reagent. After the mixture has stirred about 30 minutes longer at room temperature, the reaction mixture is diluted with water and the product isolated by ether extraction. The organic layer is washed with saturated aqueous sodium bicarbonate, water, and brine, then dried and concentrated under vacuum, to give 205 mg. (40 percent yield) of 2-carboxy-1,2,3,4,4a,4b,5,6,7,9,10,10a-dodecahydro-2,4b-dimethyl-7,9-dioxo-1-phenanthrenepropionic acid, dimethyl ester, m.p. 114°–115° C.; IR and NMR spectra are superimposable with those of the analytical sample of the same product prepared in Example 4, below.

EXAMPLE 2

2-carboxytetradecahydro-7,8a,9-trihydroxy-2,4b-dimethyl-1-phenanthrenepropionic acid, dimethyl ester (IV)

A solution of 85 g. (0.224 mole) of 2-carboxy-1,2,3,4,4a,4b,5,6,7,8,10,10a-dodecahydro-7-hydroxy-2,4b-dimethyl-1-phenanthrenepropionic acid, dimethyl ester, in 500 ml. of methylene chloride is treated, dropwise over 10 minutes, with a solution of 56 g. of m-chloroperbenzoic acid in 500 ml. of methylene chloride. The mixture is stirred under nitrogen for about 1 hour at room temperature, and is then treated with 10 percent aqueous sodium sulfite until a negative starch-potassium iodide test for peroxide is obtained. The mixture is transferred to a separatory funnel, washed with saturated aqueous sodium bicarbonate solution, brine, and dried over anhydrous magnesium sulfate. Removal of the solvent gives 90 g. of 2-carboxytetradecahydro-7-hydroxy-8a,9-epoxy-2,4b-dimethyl-1-phenanthrenepropionic acid, dimethyl ester (III) as a colorless, viscous oil; the IR and NMR spectra are in accord with the structure, a mixture of $\alpha$- and $\beta$- epoxides.

The epoxide mixture (90 g.) thus obtained is dissolved in 2,500 ml. of acetone containing 90 ml. of 7 percent aqueous perchloric acid solution. The mixture is stirred under nitrogen at room temperature for about 16 hours. Most of the acetone is then removed at reduced pressure; water is added during the solvent removal to maintain the same total volume to avoid concentrating the perchloric acid. Filtration, followed by drying at 80° C. under vacuum, yields 68 g. of 2-carboxytetradecahydro-7,8a,9-trihydroxy-2,4b-dimethyl-1-phenanthrene-propionic acid, dimethyl ester (IV), m.p. 207°–208° C.; two recrystallizations from aqueous methanol gives an analytical sample, m.p. 218°–219° C.; the IR ($\nu$ max 3500,3400,3350 cm.$^{-1}$) and NMR spectra are in agreement with the structure.

Anal. Calcd. for $C_{22}H_{36}O_7$: C, 64.05; H, 8.80.
Found: C, 63.84 H, 8.84.

EXAMPLE 3

2-carboxytetradecahydro-8a-hydroxy-2,4b-dimethyl-7,9-dioxo-1-phenanthrenepropionic acid, dimethylester (V)

A suspension of 6.2 g. (0.015 mole) of 2-carboxytetradecahydro-7,8a,9-trihydroxy-2,4b-dimethyl-1-phenanthrenepropionic acid, dimethyl ester (IV) in 600 ml. of acetone and 400 ml. of methylene chloride is cooled to about 0° C. and treated with Jones reagent [J. Org. Chem. 21, 1547 (1956)] dropwise until the red color of $Cr^{VI}$ remains. The mixture is stirred 10 minutes longer at about 0° C. and then treated with excess 2-propanol. The product is isolated by extraction with ether. The organic layer is washed with saturated aqueous sodium bicarbonate and brine, dried, and the solvent is removed at reduced pressure to give 5.6 g. (92 percent yield) of 2-carboxytetradecahydro-8a-hydroxy-2,4b-dimethyl-7,9-dioxo-1-phenanthrenepropionic acid, dimethylester (V) m.p. 120°–124° C.; recrystallization from $CCl_4$ gives an analytical sample, m.p. 125.5°–126.0° C.; IR ($\nu_{max}$ 3460,1730,1720,1705 cm.$^{-1}$) and NMR spectra are in accord with the structure.

Anal. Calcd. for $C_{22}H_{32}O_7$: C, 64.68; H, 7.90.
Found: C, 64.58; H, 7.86.

EXAMPLE 4

2-carboxy-1,2,3,4,4a,4b,5,6,7,9,10,10a-dodecahydro-2,4b-dimethyl-7,9-dioxo-1-phenanthrenepropionic acid, dimethyl ester (VI)

A solution of 15 g. of 2-carboxytetradecahydro-8a-hydroxy-2,4b-dimethyl-7,9-dioxo-1-phenanthrenepropionic acid, dimethylester (V), in 500 ml. of glacial acetic acid is heated at reflux under nitrogen for 2 hours. After most of the acetic acid has been subsequently removed at reduced pressure ether is added to give 11 g. of 2-carboxy-1,2,3,4,4a,4b,5,6,7,9,10,10a-dodecahydro-2,4b-dimethyl-7,9-dioxo-1-phenanthrenepropionic acid, dimethyl ester (VI), m.p. 112°–114° C.; recrystallization from ether-hexane affords an analytical sample, m.p. 114°–115° C.; the IR ($\nu_{max}$ 1740,1690,1610 cm.$^{-1}$), NMR, UV [ $\lambda$ $\lambda_{max.}^{neutral}$ EtOH 250 (10,800); $\lambda_{max.}^{acidic}$ 250 (10,900) and 310 (718); $\lambda_{max.}^{basic}$ 257 (10,150) and 378 (7,750)] and mass spectra supports the structure.

Anal. Calcd. for $C_{22}H_{30}O_6$: C, 67.67; H, 7.74.
Found: C, 67.67; H, 7.82.

EXAMPLE 5

2,3,3a,4,5,6,9,10,11,11a,11b,11c-dodecahydro-7-hydroxy-3,11a-dimethyl-6,9-dioxo-1H-benz [de] anthracene-3-carboxylic acid, methyl ester (Ia)

To a suspension of 1.29 g. (31 mmoles) of sodium hydride (57 percent dispersion) in 30 ml. of dry tetrahydrofuran is added a solution of 6.0 g. (15.4 mmoles) of 2-carboxy-1,2,3,4,4a,4b,5,6,7,9,10,10a-dodecahydro-2,4b-dimethyl-7,9-dioxo-1-phenanthrenepropionic acid, dimethyl ester (VI) in 60 ml. of tetrahydrofuran. The addition takes place over 15 minutes at room temperature under nitrogen, and the mixture is then stirred two hours longer at room temperature. (Hydrogen evolution becomes quite vigorous after approximately 30 minutes.) After about 2 hours, 6 ml. of glacial acetic acid is added to the mixture. After dilution of the mixture with water and ether, the product is isolated by ether extraction. The ether layer is washed with saturated aqueous sodium bicarbonate solution, dried and concentrated under vacuum to yield 6.0 g. of crude product as a viscous oil. The oil thus obtained is chromatographed on 1.2 l. of neutral silica. Elution with 20 percent ethyl acetate in benzene gives 2.65 g. (41 percent yield) of crystalline 2,3,3a,4,5,6,9,10,11,11a,11b,11c-dodecahydro-7-hydroxy-3,11a-dimethyl-6,9-dioxo-1H-benz [de] anthracene-3-carboxylic acid, methyl ester (Ia); m.p. 176°–177° C.; two recrystallizations from ethyl acetate-cyclohexane gives 2,3,3a,4,5,6,9,10,11,11a,11b,11c-dodecahydro-7-hydroxy-3,11a-dimethyl-6,9-dioxo-1H-benz [de] anthracene-3-carboxylic acid, methyl ester (Ia), m.p. 178.5°–179.0° C.; the IR ($\nu$ 1730,1670,1615,1600,1565 cm.$^{-1}$), the UV [ $\lambda_{max.}^{neutral}$ EtOH 246 (4,500), 270 (7,550), 346 (13,800); $\lambda_{max.}^{basic}$ 267 (7,350) and 411 (6,500)], NMR and mass spectra are in accord with the structure.

Anal. Calcd. for $C_{21}H_{26}O_5$: C, 70.37; H, 7.31.
Found: C, 70.46; H, 7.41.

Continued elution of the above chromatogram with 20 percent ethyl acetate-benzene gives 2.14 g. (34 percent yield) of 16-carbomethoxy-4-androstene-3,6,17-trione. The IR and NMR spectra of this material are in agreement with the structure.

EXAMPLE 6

2,3,3a,4,5,6,9,10,11,11a,11b,11c-dodecahydro-7-hydroxy-3,11a-dimethyl-6,9-dioxo-1H-benz [de] anthracene-3-carboxylic acid, methyl ester (Ia)

A solution of 7.48 g. of 2-carboxy-1,2,3,4,4a,4b,5,6,7,9,10,10a-dodecahydro-2,4b-dimethyl-7,9-dioxo-1-phenanthrenepropionic acid, dimethyl ester in 400 ml. of nitrogen-purged methanol is treated under nitrogen at room temperature with a solution of 6.4 g. of potassium hydroxide in 225 ml. of nitrogen-purged water. The resulting mixture is heated at reflux under nitrogen for 1 hour. After the mixture is cooled, most of the methanol is removed at reduced pressure. The residue is diluted with water and extracted with ether to remove neutral materials. Acidification of the aqueous layer, followed by extraction with methylene chloride, drying with magnesium sulfate and removal of the solvent, gives 6.8 g. of the mono-acid, 2-carbomethoxy-1,2,3,4,4a,4b,5,6,7,9,10,10a-dodecahydro-2,4b-dimethyl-7,9-dioxo-1-phenanthrenepropionic acid (VII); the IR, and NMR spectra support the structure.

To a suspension of 864 mg. (5.32 mmoles) of N,N'-carbonyldiimidazole in 8 ml. of tetrahydrofuran is added a solution of 1.0 g. (2.66 mmoles) of the mono-acid prepared above in 5 ml. of tetrahydrofuran. The addition is accomplished in approximately 2 minutes at room temperature under nitrogen. Although the carbon dioxide evolution ceases after about 30 minutes, the mixture is stirred two hours longer at room temperature to ensure complete formation of the imidazolide derivative of 2-carbomethoxy-1,2,3,4,4a,4b,5,6,7,9,10,10a-dodecahydro-2,4b-dimethyl-7,9-dioxo-1-phenanthrenepropionic acid (VIII). Then 240 mg. (5.75 mmoles) of sodium hydride (57 percent dispersion) is added and the resulting mixture is stirred for 2 hr. at room temperature under nitrogen. After cooling, the mixture is treated with 2 ml. of acetic acid, poured into dilute hydrochloric acid solution and extracted with ether. The ether layer is washed with dilute aqueous hydrochloric acid, water, saturated aqueous sodium bicarbonate and brine, dried, and concentrated under vacuum. The crude product (1.06 g.) is chromatographed on 200 ml. of neutral silica. Elution with 25 percent ethyl acetate-benzene afforded 398 mg. (42 percent yield) of crystalline 2,3,3a,4,5,6,9,10,11,11a,11b,11c-dodecahydro-7-hydroxy-3,11a-dimethyl-6,9-dioxo-1H-benz [de] anthracene-3-carboxylic acid, methyl ester, m.p. 176°–178° C.; the IR and NMR spectra of this material are identical to those of an authentic sample of the same material prepared in Example 5, above; mixed m.p. 175°–178° C.

We claim:

1. 2,3,3a,4,5,6,9,10,11,11a,11b,11c-dodecahydro-7-hydroxy-3,11a-dimethyl-6,9-dioxo-1H-benz[de]anthracene-3-carboxylic acid, methyl ester.

* * * * *